(12) United States Patent
Rowledge

(10) Patent No.: US 7,095,136 B2
(45) Date of Patent: Aug. 22, 2006

(54) CO-OPERATIVE ADVANCE WARNING SYSTEM FOR ROAD HAZARDS

(76) Inventor: Darrel Rowledge, 2428 Capital Hill Crescent, NW., Calgary, Alberta (CA) T2M 4M2

( * ) Notice: Subject to any disclaimer, the term of this patent is extended or adjusted under 35 U.S.C. 154(b) by 390 days.

(21) Appl. No.: 10/698,366

(22) Filed: Nov. 3, 2003

(65) Prior Publication Data

US 2004/0100371 A1    May 27, 2004

Related U.S. Application Data

(63) Continuation of application No. 09/719,566, filed as application No. PCT/CA99/00598 on Jun. 30, 1999, now abandoned.

(30) Foreign Application Priority Data

Jun. 30, 1998    (CA) .................................. 2242023

(51) Int. Cl.
    *B60L 1/14*    (2006.01)

(52) U.S. Cl. ..................................................... 307/10.8
(58) Field of Classification Search ................ 307/10.8
    See application file for complete search history.

(56) References Cited

U.S. PATENT DOCUMENTS 5,663,705 A * 9/1997 Pretorius et al. ............ 340/435
5,914,651 A * 6/1999 Smalls ........................ 340/436

* cited by examiner

*Primary Examiner*—Robert L. Deberadinis
(74) *Attorney, Agent, or Firm*—John S. Hale; Gipple & Hale

(57) ABSTRACT

The present invention is a cooperative advance warning system for use in warning oncoming traffic of unexpected upcoming road hazards. The system comprises a lamp mounted on a vehicle so that light emitted by the lamp is visible to drivers of oncoming vehicles, a switch accessible to the driver for activating the lamp when the driver comes upon an unexpected road hazard, and an electronic control unit for controlling the characteristics of the light emitted from the lamp.

19 Claims, 6 Drawing Sheets

CO-OPERATIVE ADVANCE WARNING SYSTEM FOR ROAD HAZARDS

This application is a Continuation of Ser. No. 09/719,566 Mar. 6, 2001 abandoned which is a 371 of PCT/CA99/00598 Jun. 30, 1999.

FIELD OF INVENTION

The present invention generally relates to advance warning systems for road hazards and more specifically it relates to a cooperative advance warning system for vehicles that can be activated by the driver of a vehicle to warn oncoming drivers of unexpected upcoming hazards.

BACKGROUND OF THE INVENTION

Motor vehicle accidents kill thousands of people in North America and world wide each year. Many of these accidents are either directly or indirectly caused by unexpected road hazards which can include anything from wildlife or livestock on the road to stalled cars, fog banks, black ice, smoke, fallen rock vehicle and other accidents, farm and various other machinery, lost loads and vehicle debris, downed trees, wash-outs, snowslides, mud slides and the like. These hazards are dangerous, and often cause accidents, precisely because they are unexpected.

Advance warning of such random, unexpected road hazards, sufficient to alert the driver of an oncoming vehicle and permit him or her time to slow down or stop, is all that is normally required to prevent an accident.

Currently, however, even where drivers negotiate such circumstances and are therefore aware of the unusual danger or condition lying ahead of the oncoming traffic, and wish to warn oncoming drivers, there is no established or accepted, safe and reliable method or device to allow them to communicate an advance warning to approaching vehicles.

While flashing one's headlights could be interpreted as such a warning, it is cumbersome and generally not understood as a signal connoting impending danger. Plus, one would have to repeatedly flash the vehicle headlights for each oncoming vehicle or group of vehicles. In addition, such practice is not advisable at night since either human or mechanical failure to get the lights back on presents a significant danger in itself. An additional problem with head light flashing, is that the driver of the oncoming vehicle has no way of knowing the distance to the upcoming, unexpected road hazard. This may result in the driver relaxing and speeding up just before coming upon the hazard.

Similarly, four-way flashers, which flash signal lights at all four corners of the vehicle simultaneously, indicate that the flashing vehicle is, itself, the hazard. Turn signals indicate turns. Even hand signals are of little value.

In U.S. Pat. No. 5,237,306, issued to Robert Adell on Aug. 17, 1993, a signalling system is described for requesting a driver of a motor vehicle to dim or turn. on his vehicle's headlights, but Adell provides no means for warning oncoming drivers of an upcoming roadhazard, or for informing them of the relative location of that road hazard.

SUMMARY OF THE INVENTION

Accordingly, it is an object of the present invention to provide a cooperative advance warning system for road hazards that will enable drivers to warn oncoming traffic of unusual and unexpected hazards which obviates and mitigates from the disadvantages of the prior methods.

A further object of the present invention is to provide a cooperative advance warning system for road hazards which is easy and convenient to initiate and requires little effort or distraction of the driver and which delivers an advance warning to oncoming drivers that is clear, obvious, unmistakable and which will not be confused with any other signal.

It is a further object of a preferred embodiment of the present invention to provide a cooperative advance warning system for road hazards that can be used to warn oncoming drivers of upcoming, unexpected road hazards and indicate to them whether the hazard is relatively near or far.

According to the present invention, there is provided a cooperative advance warning system for use on a vehicle to warn drivers of oncoming vehicles of an upcoming, unexpected road hazard comprising: a lamp mounted on the vehicle in a location where light emitted by the lamp is visible to drivers of the oncoming vehicles; a switch means connected to the lamp for activating and deactivating the lamp, the switch means mounted to the vehicle in a location that is easily accessible to the driver of the vehicle; and an electronic control means connected to the lamp for controlling the characteristics of the light emitted by the lamp, the electronic control means being capable of causing the lamp to flash on and off at a pre-determined frequency, the predetermined frequency being variable depending on the length of time the lamp has bean activated According to another aspect of the present invention, there is provided a portable cooperative advance warning system for use in warning drivers of oncoming vehicles of an upcoming, unexpected road hazard comprising: a housing; a lamp mounted to the housing; a switch means mounted on the housing and connected to the lamp for activating and deactivating the lamp; an electronic control means mounted to the housing and connected to the lamp for controlling the characteristics of the light emitted by the lamp, the electronic control means being capable of causing the lamp to flash on and off at a pre-determined frequency, the predetermined frequency being variable depending on the distance from the road hazard; and a power supply for providing power to the system.

The present invention advantageously provides a cooperative advance warning system for road hazards which is inexpensive and easy to use. A further advantage is that it can be easily adapted to and installed on any vehicle, new or old. Another advantage is that the present system avoids confusing drivers of oncoming vehicles by providing a warning which is specific to an upcoming, unexpected road hazard. Yet another advantage is that the present system is easy and convenient to initiate, takes little effort and causes little distraction to the driver. Additionally, an important advantage of a preferred embodiment of the present invention is that it can indicate to drivers of oncoming vehicles whether the road hazard is near or far.

Other advantages, objects and features of the present invention will be readily apparent to those skilled in the art from a review of the following detailed descriptions of a preferred embodiment in conjunction with the accompanying drawings and claims.

BRIEF DESCRIPTION OF THE DRAWINGS

Preferred embodiments of the present invention will now be described in greater detail, and will be better understood when read in conjunction with the following drawings, in which.

Similar references are used in different figures to denote similar components.

DETAILED DESCRIPTION OF THE INVENTION

Figure 1:
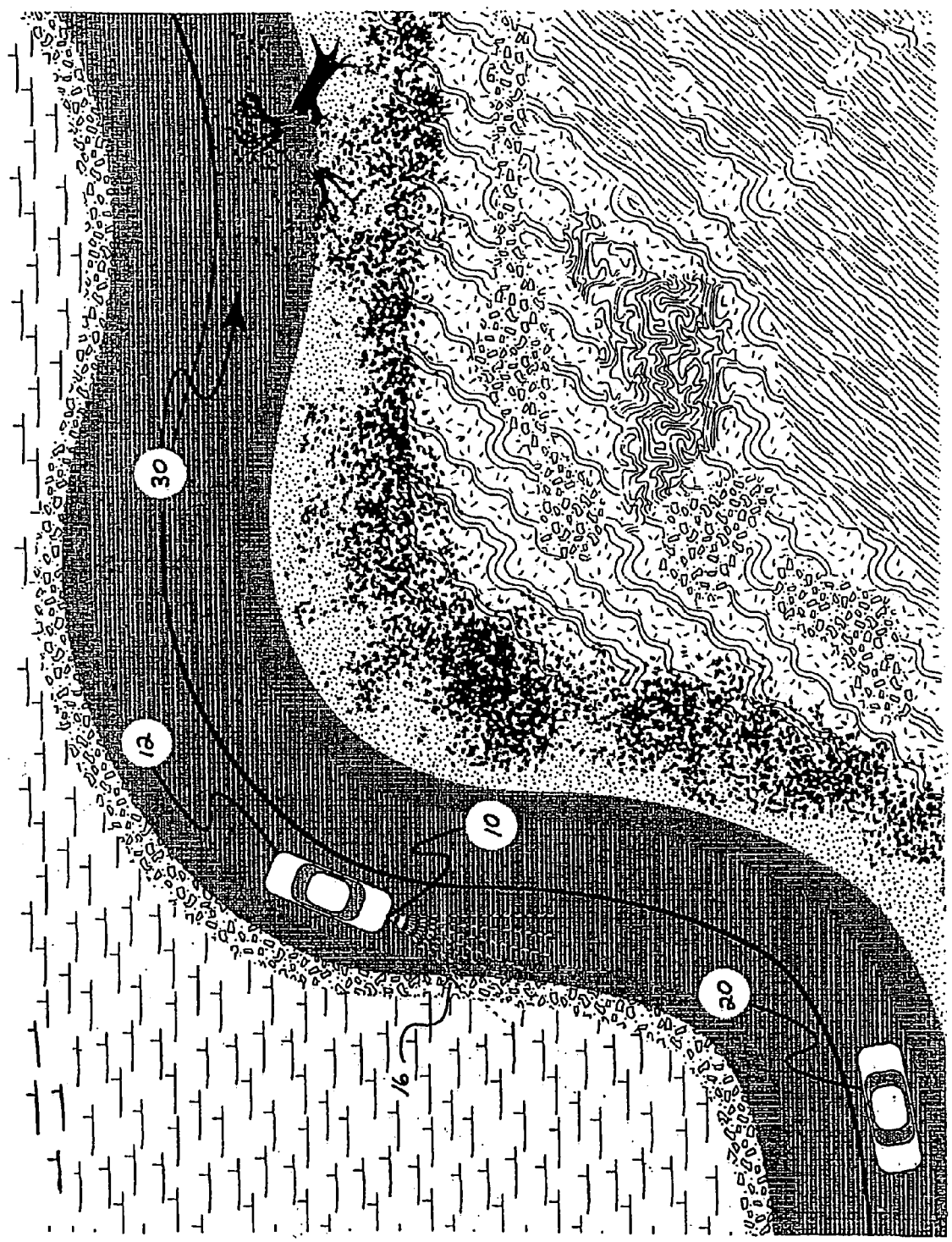
FIG. 1, is a schematic representation of a typical application of the present invention to warn drivers of oncoming vehicles of an upcoming, unexpected road hazard.

FIG. 1 is a schematic representation of a typical application of the present invention. The cooperative advance warning system for road hazards 10 is shown installed on a vehicle 12. An oncoming vehicle 20 is shown approaching vehicle 12 and a road hazard 30 (in this case, a fallen tree) is shown partially blocking the driving lane of oncoming vehicle 20. In FIG. 1, the driver of vehicle 12 sees road hazard 30 and activates cooperative advance warning system 10 which emits a light beam 16 that is clearly visible to the driver of oncoming vehicle 20. The driver of oncoming vehicle 20 is thus warned of upcoming, unexpected road hazard 30 and is provided with plenty of time to slow down and avoid the hazard.

Figure 2:
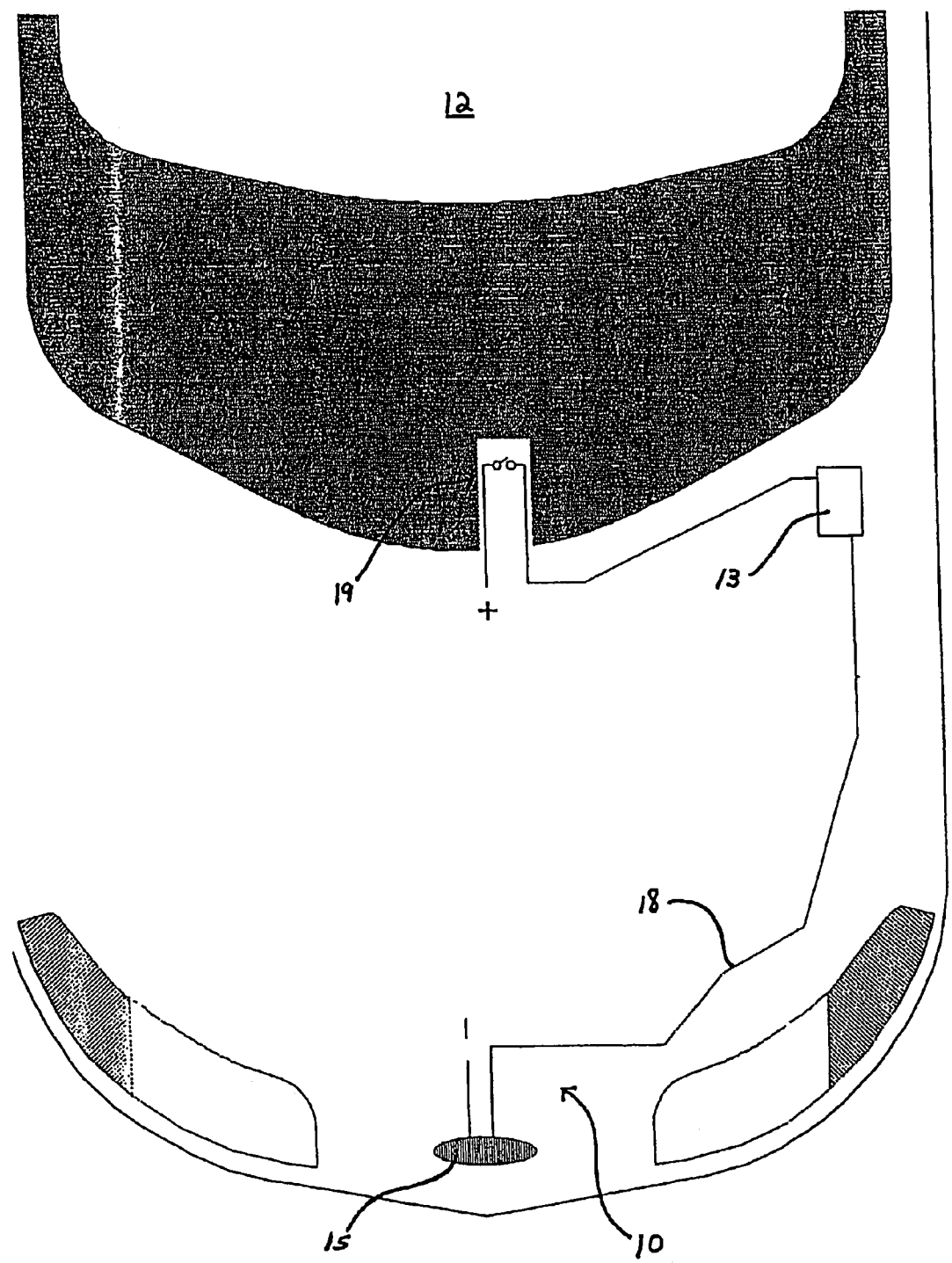
FIG. 2, is a schematic, partially sectional, plan view of the front portion of a vehicle on which the present invention has been installed.
Figure 4:
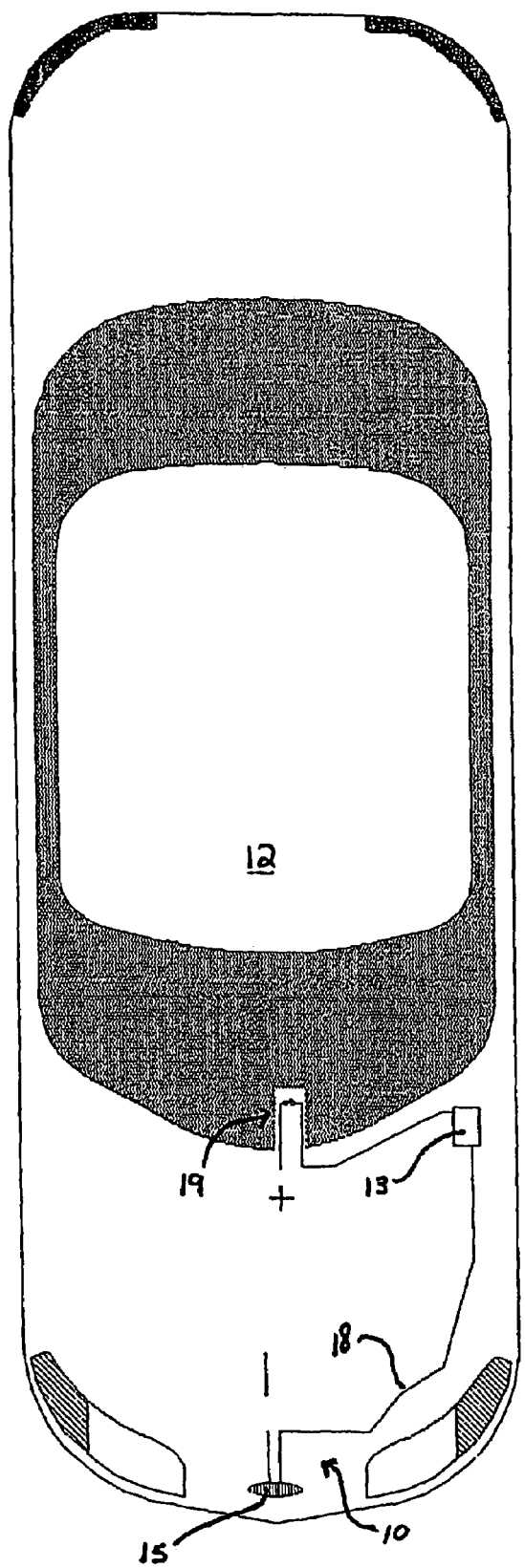
FIG. 4, is a schematic, partially sectional plan view of the entire vehicle shown in FIG. 2.

Referring to FIGS. 2 and 4, cooperative advance warning system 10 comprises a lamp 15, one side of which is connected by electrically conductive wire 18, to an electronic control unit 13 and to one side of switch 19. The other side of switch 19 is connected to the positive side of the vehicle battery or power supply while the other side of lamp 15 is connected to the common vehicle ground. Activating switch 19 completes the circuit and causes lamp 15 to emit a beam of light 16 (see FIG. 1) out of the front of vehicle 12. This light beam is clearly visible to the driver of oncoming vehicle 20, thus providing a warning to that driver of an upcoming, unexpected road hazard 30. An in-use indicator light (not shown), easily visible to the driver of vehicle 12, is connected to switch 19 and electronic control unit 13 to inform the driver when the system is operating.

In a preferred embodiment of the present invention, electronic control unit 13 is designed to cause lamp 15 to emit light in various patterns following initial activation. For example, lamp 15 can be caused to automatically deactivate after a predetermine length of time. Lamp 15 may also be caused to continuously flash on and off for a predetermine length of time to provide a more visible warning signal. In another example, the frequency of the on and off flashes of lamp 15 can be reduced over time, so that initially lamp 15 flashes rapidly to indicate that the road hazard is near and as the time interval from initial activation increases, the frequency of the flashes is decreased until lamp 15 is completely deactivated. In this example, there is an inverse proportional relationship between the frequency of the flashes and the time interval since activation. In a further example, the cadence of the flashes can be altered to correspond to the distance from the road hazard. Rapid single flashes could indicate imminent danger, while lower frequency double flashes could be used to indicate a more distance hazard, and still lower frequency triple flashes could signify a far off problem. In yet another example, the frequency or cadence of the flashing light can be selected and maintained at a given value to permit a parked vehicle to be used to continuously warn on coming traffic of an impending hazard. In this example, lamp 15 will remain flashing at the selected frequency or cadence until deactivated by the operator.

Figure 6:
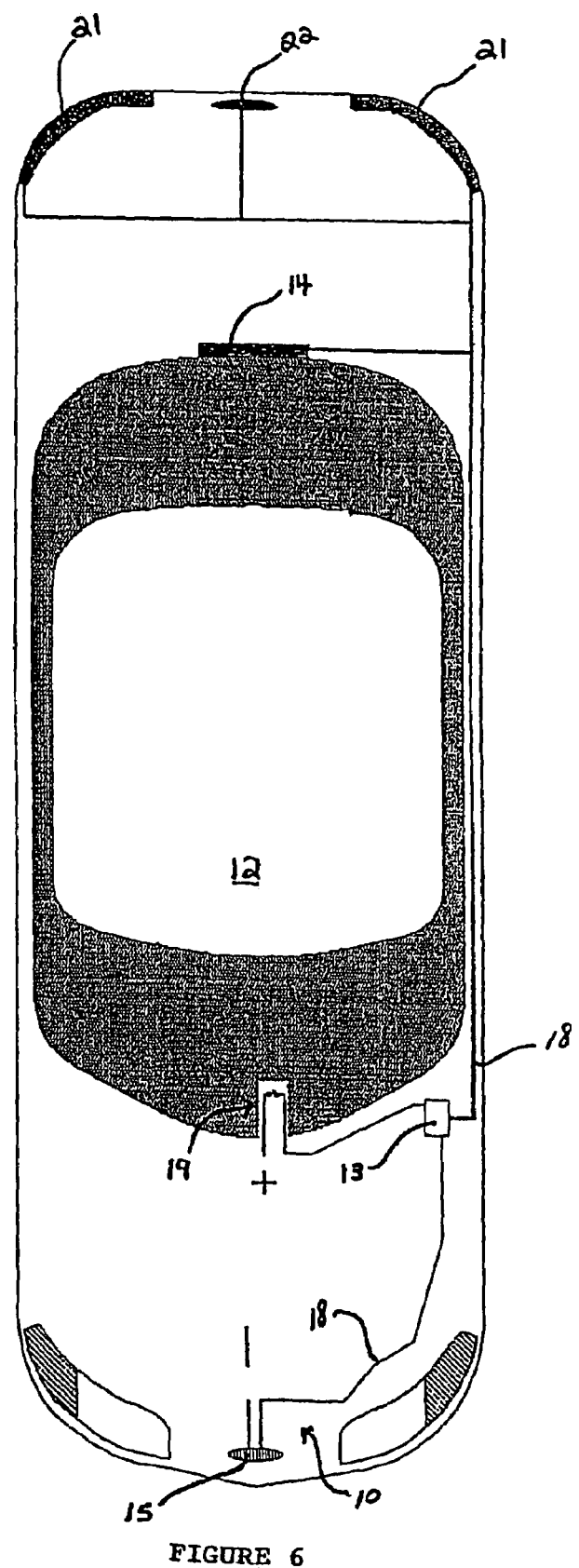
FIG. 6, is a schematic, partially sectional plan view of an alternative embodiment of the present invention installed on a vehicle.

Referring to FIG. 6, in yet another preferred embodiment of the present invention there is provided a connection 18 between electronic control unit 13 and the centre high-mounted brake light 14, and/or the rear tail-mounted brake lights 21 of the vehicle, and/or a separate rear-facing warning light 22. Upon activation of the system, the centre high-mounted brake light 14 and/or rear tail-mounted brake lights 21 of the vehicle, and/or the separate rear-facing warning light 22, are caused to flash rapidly on and off in conjunction with lamp 15 for a brief period of perhaps 10 seconds. This acts as an immediate warning to any vehicle travelling behind vehicle 12 to be on the lookout for a road hazard.

In a further variation of this preferred embodiment of the present invention, switch 19 is provided with an alternative position called the urban or immediate mode. When the system is switched into or held in this urban or immediate mode, control unit 13 causes lamp 15, the centre high-mounted brake light 14, and/or the rear tail-mounted brake lights 21, and/or a separate rear-facing warning light 22, to rapidly flash on and off for as long as switch 19 remains in the urban or immediate position.

Urban or immediate mode can be used to warn vehicles approaching from both directions of an immediate hazard, such as a pedestrian crossing the street, but is especially effective in warning vehicles approaching from the rear since in many cases, the approaching driver's view of pedestrians and the like is obscured by the lead vehicle. Streets with turn lanes, or having multiple lanes of traffic, present serious dangers to pedestrians attempting to cross such streets, even when attempting to do so at specially designated pedestrian corridors, since many of these corridors are not equipped with overhead warning lights. Vehicles stopping to allow pedestrians to cross in front often obscure the view for other approaching vehicles, especially those approaching from behind. Further, the driver of an approaching vehicle may assume that the stopped vehicle is itself the only hazard (perhaps the stopped vehicle is intending to turn without having signalled, or is allowing passengers to disembark, or perhaps has mechanical problems). Such assumption, in conjunction with the obstructed view of the pedestrians, can put the pedestrians in serious danger of being struck once they enter the adjacent lanes of traffic. The driver of the stopped vehicle currently has no way of warning other approaching vehicles that a pedestrian is crossing. The present invention, when used in the above-described urban or immediate mode can warn traffic approaching from both directions of the presence of a pedestrian or other hazard. Urban or immediate mode could also be used to warn traffic approaching from the rear of other hazards such as pets crossing, dangerous breaks in the road, lost loads, or other obstructions.

Figure 3:
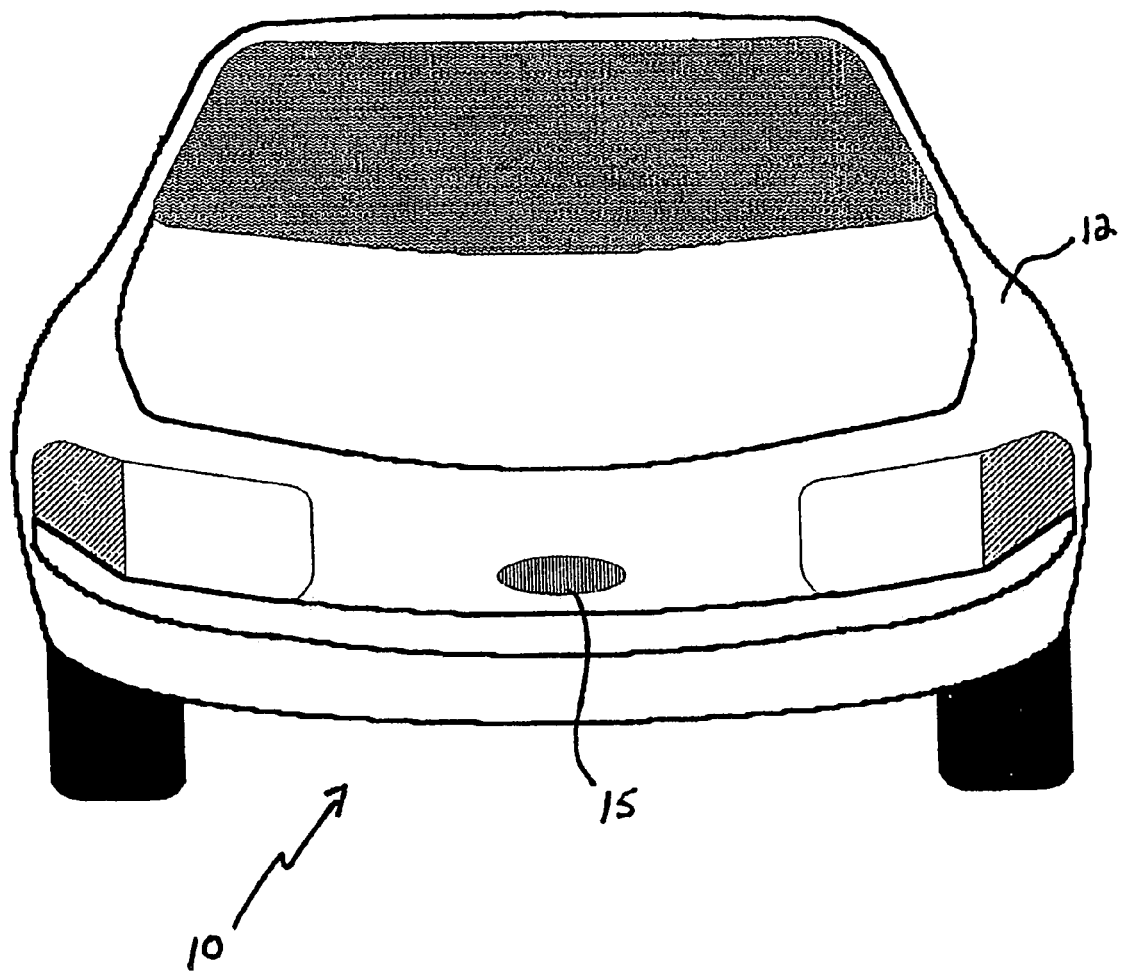
FIG. 3, is a front perspective view of the vehicle shown in FIG. 2.

FIG. 3 provides an example of a typical location for installation of cooperative advance warning system 10. Lamp 15 is shown to be installed on the front of vehicle 12, between and in-line with the two front head lights. However, if will be readily understood by those skilled in the field that lamp 15 can be placed in any location where its light would be plainly visible to drivers of oncoming vehicles.

With reference to FIGS. 1 to 4, the operation of the present invention will now be described in more detail. The cooperative advance warning system 10 is designed to provide all drivers of oncoming vehicles with advance warning of upcoming, unexpected road hazards. As vehicle 12 passes unexpected, road hazard 30, the driver of vehicle 12 will activate the cooperative advance warning system 10 using switch. 19. Lamp 15 will thus be activated and emit a beam of light 16 to warn the driver of oncoming vehicle 20 of the upcoming, unexpected road hazard 30. This provides the driver of vehicle 20 sufficient time to slow down and avoid the hazard. Once vehicle 20 has confirmed the presence of road hazard 30, the driver of vehicle 20, when it is safe to do so, activates the cooperative advance warning system on his or her vehicle to warn drivers of vehicles approaching from the opposite direction. In this fashion, almost all drivers approaching unexpected road hazard 30 can be given ample warning to permit them to avoid the danger, thereby significantly reducing the probability of accident.

To use the urban or immediate mode of a preferred embodiment of the present invention as described above, the vehicle operator, upon encountering or stopping to permit a pedestrian to cross the street or encountering or stopping to avoid a road hazard, manually places switch 19 into urban or immediate mode. This causes the centre high-mounted brake light 14, and/or the rear tail-mounted brake lights 21, and/or a separate rear-facing warning light 22 to flash on and off rapidly in conjunction with lamp 15, thereby warning all approaching vehicles of the presence of a pedestrian or other road hazard.

Light beam 16 emitted by lamp 15 can be of any highly visible and distinctive colour, however, the applicant has found the colours fuchsia and pink to be most effective. The colour is selected to not only be visible in both daylight and at night, but also to distinguish from all other lights common on vehicles and in traffic. It is the applicant's expectation that all drivers, once they become knowledgeable of the present invention, will immediately learn to recognize and associate the colour and cadence of light emitted by lamp 15, and the cadence and flashing of the centre high-mounted brake light 14, and/or the rear tail-mounted brake lights 21, and/or a separate rear-facing warning light 22, with an upcoming, unexpected road hazard.

As indicated above, lamp 15 can be made to flash at different frequencies and with differing cadence depending on the time interval since activation. This will indicate to the driver of oncoming vehicle 20 that road hazard 30 is either relatively near or far.

Figure 5:
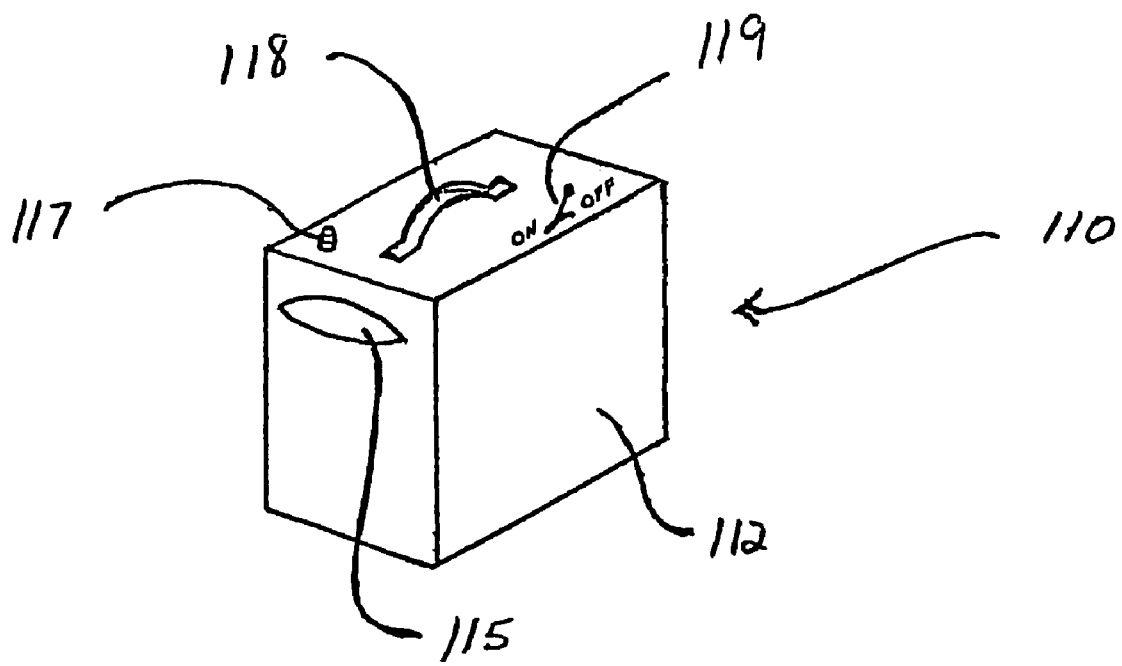
FIG. 5, is a perspective view of a portable version of the present invention.

The present cooperative advance warning system may also be provided in a self-contained, stand-alone portable unit such as that shown in FIG. 5. The portable cooperative advance warning system 110, as shown in FIG. 5, has a housing 112 to which is mounted a lamp 115, a switch 119, an in-use indicator light 117 and a handle 118 for transporting the unit. Lamp 115, switch 119 and in-use indicator light 117 are connected to a power supply (not shown) and an electronic control unit (not shown) contained within housing 112. All of the components of the portable system 110 shown in FIG. 5 are identical and perform the same functions as the corresponding components of the cooperative advanced warning system 10, described above and shown in FIGS. 1 to 4.

One further advantage of the portable cooperative advance warning system 110 herein described is that multiple units can be set up to warn traffic approaching a road hazard from both directions. The units can be set to maintain a pre-determined frequency or cadence corresponding to their distance from the road hazard. Unlike flares which burn out and are generally associated with the direct site of a hazard, the portable cooperative advance warning system 110 can be used to provide considerable advance warning of an upcoming road hazard for extended periods of time.

The above-described embodiments of the present invention are meant to be illustrative of a preferred embodiment of the present invention and are not intended to limit the scope of the present invention. Various modifications, variations and adaptations, which would be readily apparent to one skilled in the art, are intended to be within the scope of the present invention. The only limitations to the scope of the present invention are set out in the following appended claims.

The invention claimed is:

1. A cooperative advance warning system for use on a vehicle to warn drivers of oncoming vehicles of an upcoming, unexpected road hazard comprising:
   a lamp mounted on said vehicle in addition to standard lights found on a vehicle in a location where light emitted by said lamp is visible to drivers of the oncoming vehicles;
   a switch means connected to said lamp for activating and deactivating said lamp, said switch means mounted to the vehicle in a location that is easily accessible to the driver of the vehicle; and
   an electronic control means connected to the lamp for controlling the characteristics of the light emitted by said lamp, said electronic control means being capable of causing said lamp to flash on and off at a pre-determined frequency, said predetermined frequency being variable in proportion to the length of time said lamp has been activated.

2. A cooperative advance warning system for use on a vehicle to cooperate with drivers of oncoming vehicles to communicate a warning to the drivers of the oncoming vehicles to beware of the presence of an upcoming, unexpected road hazard comprising:
   a lamp mounted on the vehicle in a location where light emitted by said lamp is visible to drivers of the oncoming vehicles;
   a switch means connected to said lamp for activating and deactivating said lamp, said switch means mounted to the vehicle in a location that is easily accessible to the driver of the vehicle; and
   an electronic control means connected to said lamp for controlling the characteristics of the light emitted by said lamp, said electronic control means being capable of causing said lamp to flash on and off at a pre-determined frequency, said electronic control means being capable of varying said predetermined frequency in proportion to the length of time said lamp has been activated.

3. A cooperative advance warning system according to claim 2, wherein said electronic control means comprises means to automatically deactivate said lamp after a pre-determined period of time following activation.

4. A cooperative advance warning system according to claim 2, wherein said electronic control means is capable of varying said pre-determined frequency inversely proportional to the length of time said lamp has been activated.

5. A cooperative advance warning system according to claim 2, wherein said pre-determined frequency comprises a cadence.

6. A cooperative advance warning system according to claim 2, wherein said electronic control means further comprises means to maintain said pre-determined frequency or cadence at a particular value for an indefinite period.

7. A cooperative advance warning system according to claim 2, further comprising an in-use indicator light connected to said switch means and to said electronic control means for indicating to the driver of the vehicle when the cooperative advance warning system is operating.

8. A cooperative advance warning system according to claim 2, wherein the colour of light emitted by said lamp is selected from the group of colours consisting of fuchsia and pink.

9. A cooperative advance warning system according to claim 2, for use on a vehicle having brake lights, further comprising:
   a connection between said electronic control means and the vehicle brake lights,
   said electronic control means being capable of causing the vehicle brake lights to flash on and off at a high frequency upon activation of the advance warning system.

10. A cooperative advance warning system according to claim 9, wherein the vehicle brake lights remain flashing on and off only for a pre-determined period of time following activation of the advance warning system.

11. A cooperative advance warning system according to claim 2, further comprising:
   a rear-facing warning light mounted on the rear of the vehicle; and
   a connection between said electronic control means and said rear-facing warning light,
   said electronic control means being capable of causing said rear-facing warning light to flash on and off at a high frequency upon activation of the advance warning system.

12. A cooperative advance warning system according to claim 11, wherein said rear-facing warning light remains flashing on and off only for a pre-determined period of time following activation of the advance warning system.

13. A cooperative advance warning system according to claim 12, further comprising:
   a rear-facing warning light mounted on the rear of the vehicle; and
   a connection between said electronic control means and said rear-facing warning light,
   said electronic control means being capable of causing said rear-facing warning light to flash on and off at a high frequency upon activation of the advance warning system.

14. A cooperative advance warning system according to claim 13, wherein the vehicle brake lights remain flashing on and off only for a pre-determined period of time following activation of the advance warning system.

15. A cooperative advance warning system according to claim 13, wherein said rear-facing warning light remains flashing on and off only for a pre-determined period of time following activation of the advance warning system.

16. A cooperative advance warning system according to claim 11, wherein the vehicle brake lights remain flashing on and off only for a pre-determined period of time following activation of the advance warning system.

17. A cooperative advance warning system according to claim 2, for use on a vehicle having brake lights, further comprising:
   a connection between said electronic control means and the vehicle brake lights,
   said electronic control means being capable of causing the vehicle brake lights and said lamp to flash on and off at a high frequency upon activation of the advance warning system,
   said switch having a first mode for activating and deactivating said lamp only, and a second mode for activating and deactivating both said lamp and the vehicle brake lights.

18. A cooperative advance warning system according to claim 17, further comprising:
   a rear-facing warning light mounted on the rear of the vehicle; and
   a connection between said electronic control means and said rear-facing warning light,
   said electronic control means being capable of causing said rear-facing warning light to flash on and off at a high frequency upon activation of the advance warning system,
   said switch having a first mode for activating and deactivating said lamp only, and a second mode for activating and deactivating both said lamp, and said rear-facing warning light.

19. A cooperative advance warning system according to claim 2, further comprising:
   a rear-facing warning light mounted on the rear of the vehicle; and
   a connection between said electronic control means and said rear-facing warning light,
   said electronic control means being capable of causing said rear-facing warning light to flash on and off at a high frequency upon activation of the advance warning system,
   said switch having a first mode for activating and deactivating said lamp only, and a second mode for activating and deactivating both said lamp, and said rear-facing warning light.

* * * * *